United States Patent [19]

Yasuoka

[11] Patent Number: 4,630,496
[45] Date of Patent: Dec. 23, 1986

[54] BACKLASH CORRECTING DEVICE FOR SWIVEL ARM OF ROBOT

[75] Inventor: Hirotoshi Yasuoka, Aichi, Japan

[73] Assignee: Mitsubishi Denki Kabushiki Kaisha, Tokyo, Japan

[21] Appl. No.: 696,553

[22] Filed: Jan. 30, 1985

[30] Foreign Application Priority Data

Jan. 30, 1984 [JP]  Japan .................................. 59-13428

[51] Int. Cl.⁴ ............................................ F16H 55/18
[52] U.S. Cl. ........................................ 74/409; 74/440
[58] Field of Search .................. 74/409, 440, 410, 411

[56] References Cited

U.S. PATENT DOCUMENTS

| | | | |
|---|---|---|---|
| 1,197,261 | 9/1916 | Burke | 74/440 |
| 1,539,149 | 5/1925 | Thornburg | 74/440 |
| 1,608,050 | 11/1926 | Bailey | 74/440 |
| 1,619,799 | 3/1927 | Rounds et al. | 74/440 |
| 2,928,288 | 3/1960 | Bliss et al. | 74/440 |
| 2,966,806 | 1/1961 | Luning | 74/440 |
| 3,137,181 | 6/1964 | Guilbert | 74/440 |
| 3,365,973 | 1/1968 | Henden | 74/440 |
| 3,487,706 | 1/1970 | Resener | 74/440 |
| 4,407,544 | 10/1983 | Bahring | 74/440 |

OTHER PUBLICATIONS

"18 Ways to Control Backlash in Gearing", *Product Engineering*, Oct. 26, 1959, p. 73, item 8.

Primary Examiner—Kenneth J. Dorner
Assistant Examiner—Michael D. Bednarek
Attorney, Agent, or Firm—Sughrue, Mion, Zinn, Macpeak, and Seas

[57] ABSTRACT

A swivel shaft backlash correcting device for an arc welding robot in which backlash is eliminated, even if the gear teeth of the assembly are significantly worn. A spur gear is mounted at one end of a gear shaft, and an uprightly extending first pin is fixed to a flat part of the spur gear, the shaft being coupled through a speed reducer to an electric motor. A second pin is fixed to a flat part of a correcting gear having the same diameter and number of teeth as the spur gear and being mounted on the same shaft as the spur gear above the spur gear. A retaining ring is engaged with the first and second pins in one of a contracted or compressed state thereof so as to apply a force of expansion between the gear shaft and correcting gear. A center gear is secured to a stationary stand and engaged with the correcting gear and spur gear.

10 Claims, 13 Drawing Figures

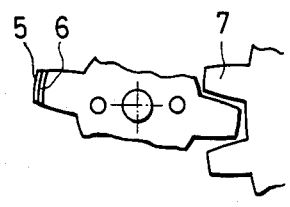
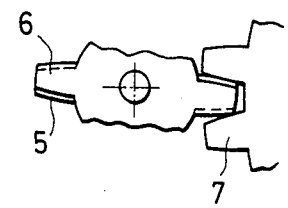
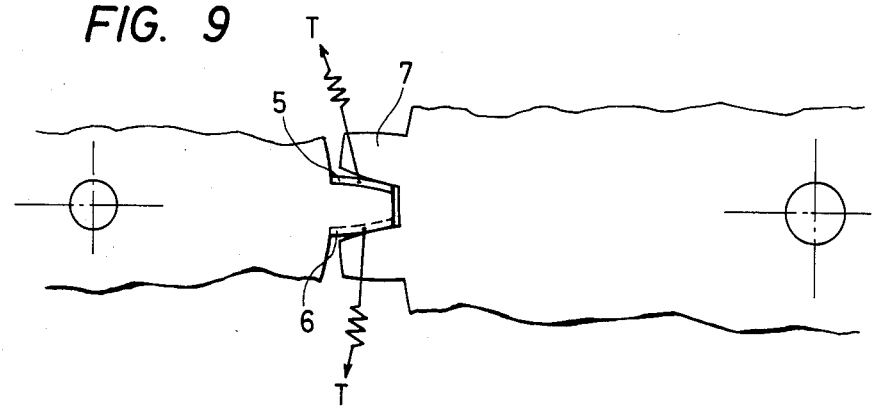
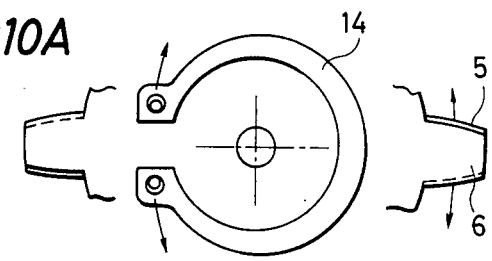
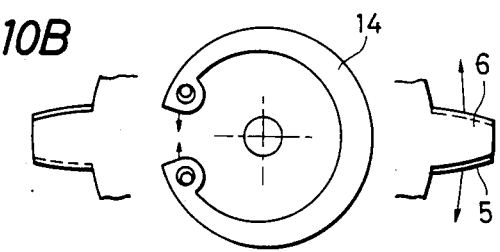

BACKLASH CORRECTING DEVICE FOR SWIVEL ARM OF ROBOT

BACKGROUND OF THE INVENTION

The present invention relates to a backlash correcting device for a swivel arm of a robot.

The invention will be described with reference to an arc welding robot, especially, an articulated arc welding robot.

The swivel section of an articulated arc welding robot of a type extensively employed in the art is constructed as shown in FIG. 1. In the swivel section, in order to simplify the configuration and to minimize backlash, a special speed reducer, namely, a harmonic drive component, is employed, and a swivel shaft driving DC servo motor is provided on the swivel shaft. More specifically, as shown in FIG. 1, the swivel section 9, borne by bearings 10, is rotated through a speed reducer 2 by a motor 1. In this arrangement, it is possible for backlash to occur in the speed reducer 2, although the occurrence of backlash has been substantially eliminated because the manufacturing accuracy of speed reducers has been remarkably improved of late.

On the other hand, in the swivel section incorporating the swivel shaft driving DC motor, if the motor becomes out of order, it cannot be readily replaced, and accordingly the production line in which the robot is used must be stopped for a long period of time. In addition, it takes a significant amount of time to replace the brushes of the motor.

In order to eliminate this difficulty, recently robots have been provided with an external swivel-shaft driving DC servo motor mounted such that the motor can be readily replaced. An example of this type of arrangement in which the motor is mounted externally of the robot is shown in FIG. 2. In this arrangement, the output of an external motor 1 is transmitted through a speed reducer 2 to a gear shaft 5 engaged with a center gear 7 so that the latter rotates a swivel section 9 which is made rotatable with bearings 10. In this operation, backlash may occur mainly in the speed reducer 2 and in the gear shaft 5 and the center gear 7 at the point of engagement. The backlash of the speed reducer 2 has been substantially eliminated as was described above. However, significant backlash of the gear shaft and the center gear at the point of engagement can still occur if the gears are worn. As shown in FIG. 3A, two gears are correctly engaged with each other before they are worn. When the gears wear, a gap A (FIG. 3B) forms between the gears, as a result of which backlash occurs. Thus, it is necessary for a robot which has an external swivel shaft driving servo motor to provide for correction of backlash occurring between the motor shaft and the swivel output.

SUMMARY OF THE INVENTION

In view of the foregoing, an object of the invention is to provide a robot swivel shaft backlash correcting device which can correct and prevent the occurrence of backlash even if the gears are worn.

The foregoing objects and other objects of the invention have been achieved by the provision of a robot swivel shaft backlash correcting device which, according to the invention, comprises: a gear shaft, a spur gear mounted at one end of the shaft, and an uprightly extending first pin having a predetermined length fixed to the flat part of the spur gear, the shaft being coupled through a speed reducer to an electric motor; a correcting gear having a through-hole in the flat part thereof through which the first pin extends, and an uprightly extending second pin having a predetermined length fixed to the flat part thereof, the correcting gear having the same diameter and number of teeth as the spur gear of the gear shaft and being mounted on the shaft of the gear shaft in such a manner that the correcting gear is placed on the spur gear; a retaining ring engaged with the first and second pins after being compressed to apply the force of expansion thereof to the gear shaft and the correcting gear; and a center gear fixedly secured to a stationary stand and engaged with the correcting gear and the spur gear of the gear shaft.

The nature, principle and utility of the invention will become more apparent from the following detailed description and the appended claims when read in conjunction with the accompanying drawings.

BRIEF DESCRIPTION OF THE DRAWINGS

In the accompanying drawings:

FIGS. 8A and 8B are explanatory diagrams showing gears for a description of the force of expansion of a retaining ring in the device of the invention;

FIG. 9 is an explanatory diagram for a description of the backlash preventing principle of the retaining ring; and FIGS. 10A and 10B are explanatory diagrams showing two different retaining rings which may be used in the device of the invention.

DESCRIPTION OF THE PREFERRED EMBODIMENTS

Preferred embodiments of this invention will be described with reference to the drawings.

Figure 1:
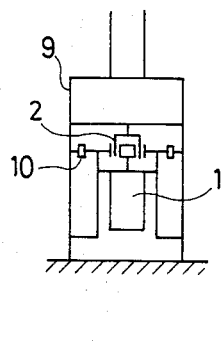
FIG. 1 is an explanatory diagram outlining the swivel section of a conventional arc welding robot having an internal driving motor.
Figure 2:
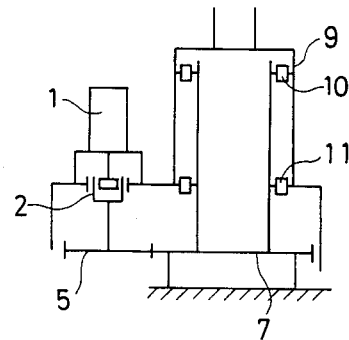
FIG. 2 is an explanatory diagram outlining the swivel section of a conventional arc welding robot having an external driving motor.
Figure 3A:
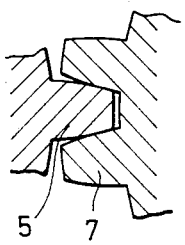
FIGS. 3A and 3B explanatory diagrams for a description of backlash with gears.
Figure 3B:
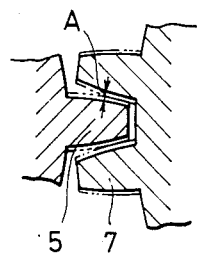
Figure 4:
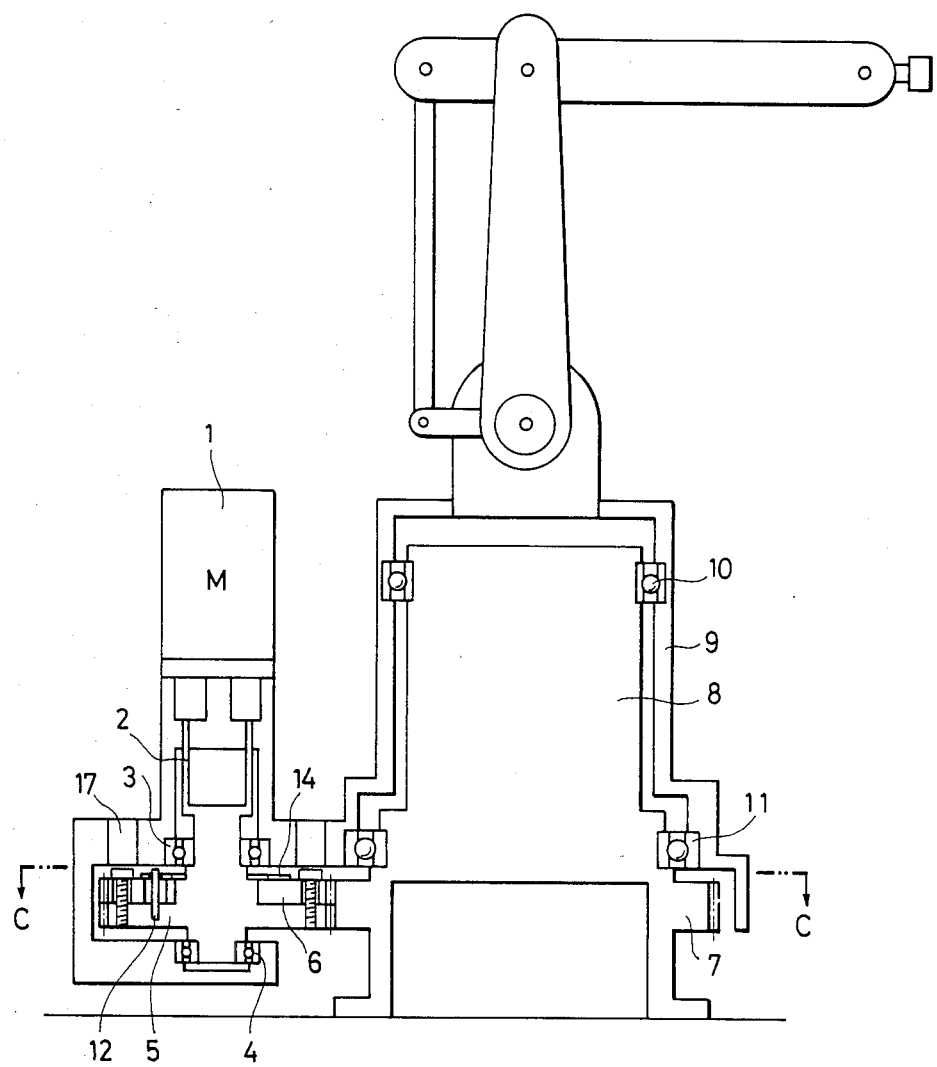
FIG. 4 is a vertical sectional view showing an arc welding robot and its swivel section.
Figure 5:
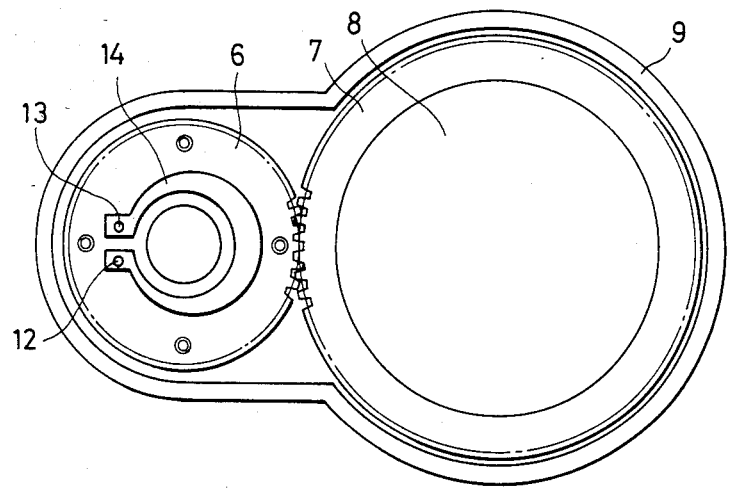
FIG. 5 is a diagram viewed in the direction C—C in FIG. 4.
Figure 6:
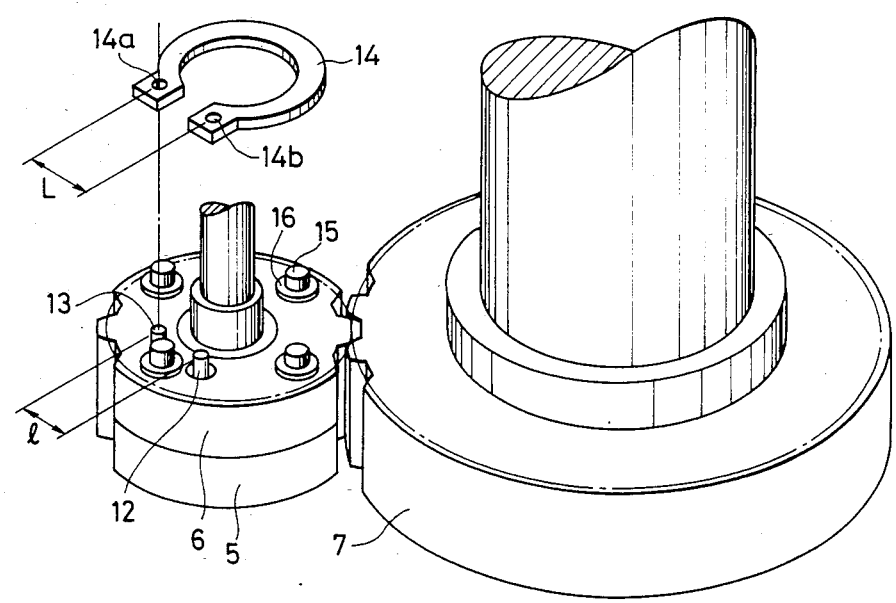
FIGS. 6 and 7 are exploded perspective views showing a swivel section, which is an essential component of a swivel shaft backlash correcting device according to the invention.
Figure 7:
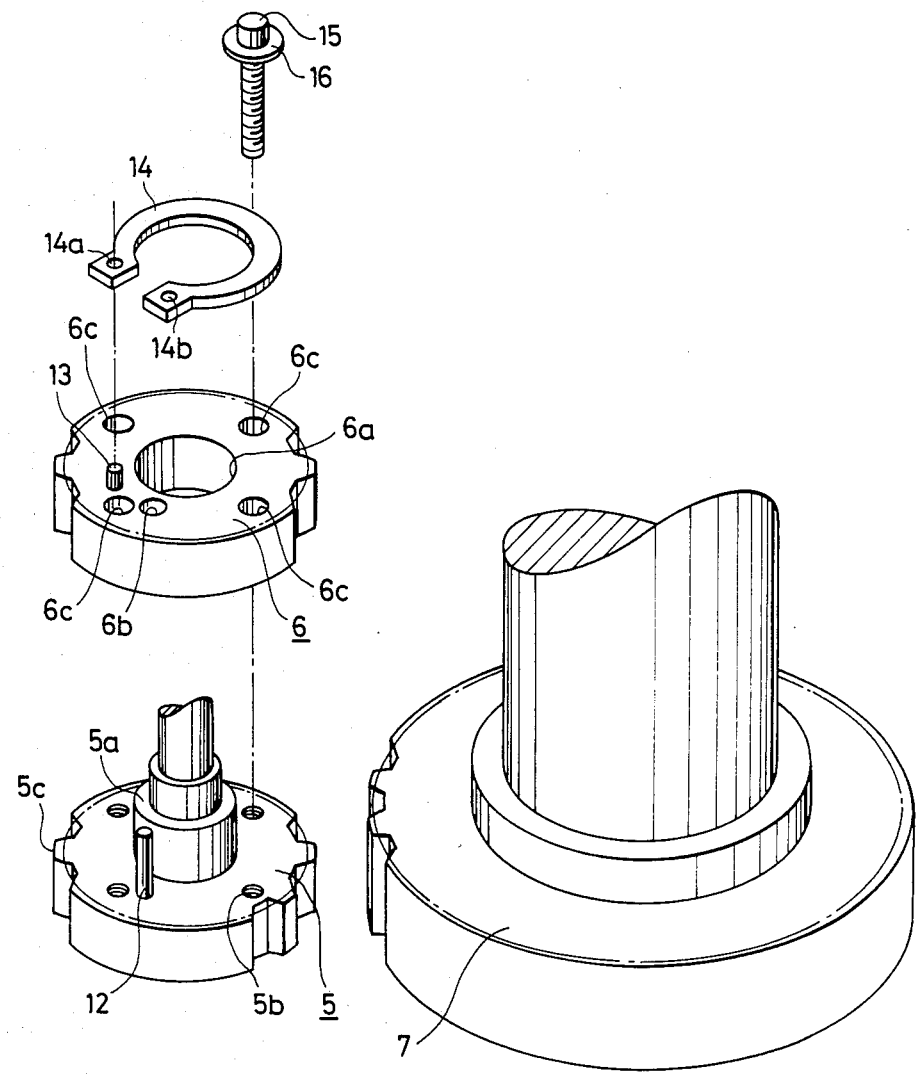

FIGS. 4 through 7 show a first embodiment of the invention. More specifically, FIG. 4 is a vertical sectional view showing an arc welding robot and its swivel section, FIG. 5 is a diagram as viewed in the direction C—C in FIG. 4, and FIGS. 6 and 7 are exploded perspective views of the swivel section, which is an essential component of the invention. In FIGS. 4 through 7, like parts are designated by like reference numerals or characters.

In this embodiment, reference numeral 1 designates a swivel shaft driving DC servo motor. The DC servo motor 1 is coupled to a speed reducer (harmonic drive component) 2 provided below it. The speed reducer 2 is coupled to a gear shaft 5 provided below it and supported by bearings 3 and 4. The gear shaft 5, as shown in FIG. 7, includes a stepped shaft part 5a having a plurality of steps and a spur gear 5c at the lower end. An uprightly extending pin 12 having a predetermined length is fixed to the upper side of the flat part of the spur gear 5c. A plurality of threaded holes 5b are formed in the flat part of the spur gear 5c. A correcting gear 6, having the same diameter and number of gear teeth as the spur gear 5c of the gear shaft 5, has a through-hole 6a into which the stepped shaft part 5a of the gear shaft 5 is inserted. Accordingly, the correcting gear 6 is placed on the spur gear 5c of the gear shaft 5 by inserting the stepped shaft part 5a of the gear shaft 5 into the through-hole 6a of the correcting gear 6. The correcting gear 6 has a through-hole 6b larger in diameter than the pin 12 so as to receive the pin 12, and a plurality of through-holes 6c in alignment with the threaded holes 5b of the spur gear 5c. The correcting gear 6 has an uprightly extending pin 13 fixed to the upper side thereof in such a manner that the pin 13 is located at a predetermined distance from the center of the through-hole 6b.

Further in the drawings, reference numeral 14 designates a C-shaped retaining ring with through-holes 14a and 14b at its opposite ends. The distance L between the two holes 14a and 14b is larger than the distance l between the pin 12 and the pin 13. Therefore, the ring 14 is compressed to engage the pin 12 and the pin 13 with the holes 14a and 14b (see FIG. 6).

Still further in the drawings, reference numeral 7 designates a center gear which is engaged with the gear shaft 5 and the correcting gear 6; 8, a stationary stand for supporting the robot; 9, a swivel stand which is adapted to swivel around the stationary stand and is supported by the bearings 10 and 11; 15, bolts; and 16, washers combined with the bolts 15. The bolts 15 with the washers 16 are screwed through the through-hole 6c into the threaded holes 5b of the gear shaft 5 so that the gear shaft 5 and the correcting gear 6 are held together by the force of friction therebetween. Later, the bolts 15 and the washers 16 are removed. That is, the bolts 15 with the washers 16 are screwed into the threaded holes 5b of the gear shaft 5 to oppose the force of expansion of the C-shaped shaft-retaining ring, thereby to facilitate the assembling work. Reference numeral 17 designates disengaging holes through which the bolts 15 with the washers 16 are disengaged from the threaded holes 5b of the gear shaft 5 (see FIG. 4).

In the first embodiment shown in FIGS. 4 through 7, the correcting gear 6 is placed on the gear shaft 5 by inserting the stepped shaft part 5a into the through-hole 6a of the correcting gear 6 and by inserting the pin 12 into the through-hole 6b. Under this condition, the bolts 15, provided with the washers 16, are passed through the through-holes 6c and screwed into the threaded holes 5b of the spur gear 5c of the gear shaft 5. Thereafter, the pin 12 and the pin 13 are inserted into the through-holes 14a and 14b, respectively, of the C-shaped shaft retaining ring 14.

The assembly of the gear shaft 5, correcting gear 6 and C-shaped retaining ring 14 is combined with the swivel section of the arc welding robot by engaging the teeth of the gear shaft 5 and the correcting gear 6 with the teeth of the center gear 7. In this operation, since the gear shaft 5 is fixedly secured to the correcting gear 6 with the bolts 15, the force of expansion of the retaining ring 14 does not affect the gear shaft and the correcting gear. That is, the gear shaft 5 and the correcting gear 6 are combined with the center gear 7 with the teeth of the gear shaft 5 in alignment with the teeth of the correcting gear. Thus, the assembling work can be achieved readily.

Thereafter, the bolts 15 and the washers 16 are removed from the assembly of the gear shaft 5 and the correcting gear 6 through the removal holes 17 (see FIG. 4). As a result, the force of expansion of the retaining ring 14 acts on the gear shaft 5 and the correcting gear 6, thereby shifting the teeth of the gear shaft 5 from the teeth of the correcting gear 6 into engagement with the teeth of the center gear 7. In this connection, it should be noted that the assembling work can be carried out readily and safely at all times.

The operation of the above-described embodiment will be described.

As the swivel shaft driving motor 1 rotates, the speed reducer (harmonic drive component) 2 coupled to the output shaft of the motor 1 is rotated, and the gear shaft 5 coupled to the speed reducer 2 and the correcting gear 6 combined with the gear shaft are rotated around the center gear 7. Finally, the swivel shaft driving motor 1 is rotated around the center gear 7 while itself rotating, thus performing a swiveling operation.

In the described embodiment, backlash is prevented as follows: As shown in FIG. 9, the force of expansion of the C-shaped retaining ring 14 causes the teeth of the gear shaft 5 and of the correcting gear 6 to engage with the teeth of the center gear 7 at all times. Therefore, even if the teeth of the gears become worn over time, the force of expansion (T) acts on the teeth so that the gears are maintained free from backlash.

In the above-described embodiment, the magnitude of the force of expansion of the C-shaped shaft-retaining ring is selected so as to be larger than the swiveling load torque, and only one C-shaped retaining ring is employed. However, a plurality of C-shaped retaining rings may be used if desired or necessary. As the force of expansion of the retaining ring is larger than the robot swirling load torque, if a swiveling movement in the rightward direction is changed to a swiveling movement in the leftward direction or vice versa, no gap forms between the teeth of the gear shaft 5 and the correcting gear 6 and those of the center gear 7.

In the above-described embodiment, the C-shaped retaining ring 14 is adapted for fitting around a shaft and its force of expansion is applied to the gear shaft 5 and the correcting gear 6 as shown in FIG. 10A. However, instead of the retaining ring 14, a C-shaped retaining ring adapted for fitting in a hole as shown in FIG. 10B may be used to apply the force of expansion to the gear shaft 5 and the correcting gear 6.

As described above, the C-shaped retaining ring in the compressed state is mounted on the pin 12 and the pin 13. Therefore, when the correcting gear and the spur gear of the gear shaft are engaged with the center gear, the force of expansion of the C-shaped retaining gear acts on the correcting gear and the spur gear so that the correcting gear and the spur gear are maintained in close contact with the center gear at all times. Therefore, even if the gear teeth are worn, no backlash is caused.

What is claimed is:

1. A swivel shaft backlash correcting device for a robot, comprising:
 a gear shaft, a spur gear mounted at one end of said shaft and having first and second axial surfaces and a plurality of threaded axial holes, said spur gear further having an axially-extending first pin having a predetermined length fixed to said first axial surface of said spur gear, said shaft being coupled through a speed reducer to an electric motor;

a correcting gear having first and second axial surfaces and disposed with its second axial surface facing said first axial surface of said spur gear, said correcting gear having an axial through-hole through which said first pin extends, a plurality of additional through-holes in alignment with said threaded axial holes in said spur gear and an axially-extending second pin having a predetermined length, said correcting gear having the same diameter and number of teeth as said spur gear;

a retaining ring disposed adjacent said first axial surface of said correcting gear and engaged with said first and second pins in a contracted or compressed state of said retaining ring to apply a force of expansion to said gear shaft and said correcting gear;

a center gear fixedly secured to a stationary stand and engaged with said correcting gear and said spur gear; and a plurality of bolts for extending through said additional through-holes in said correcting gear and threadedly engaging respective ones of said threaded holes in said spur gear.

2. The backlash correcting device as claimed in claim 1, in which a force of expansion of said retaining ring is larger than a swivel load torque of said robot.

3. The backlash correcting device as claimed in claim 2, in which a plurality of retaining rings are provided.

4. The backlash correcting device as claimed in claim 2, in which said retaining ring is C shaped.

5. The backlash correcting device as claimed in claim 4, in which said retaining ring is adapted for engagement with a shaft and is engaged with said first and second pins after being contracted.

6. The backlash correcting device as claimed in claim 4, in which said retaining ring is adapted for engagement with a hole and is engaged with said first and second pins after being compressed.

7. The backlash correcting device as claimed in claim 1, in which a body of said robot is mounted on a swivel stand which swivels around a stationary stand.

8. The backlash correcting device as claimed in claim 7, in which said swivel stand is coupled to said motor to be swiveled thereby.

9. The backlash correcting device as claimed in claim 8, in which said motor rotates around said stationary stand as said swivel stand swivels.

10. The backlash correcting device as claimed in claim 8, wherein said electric motor is disposed outside of said swivel stand.

* * * * *